Figure 5:
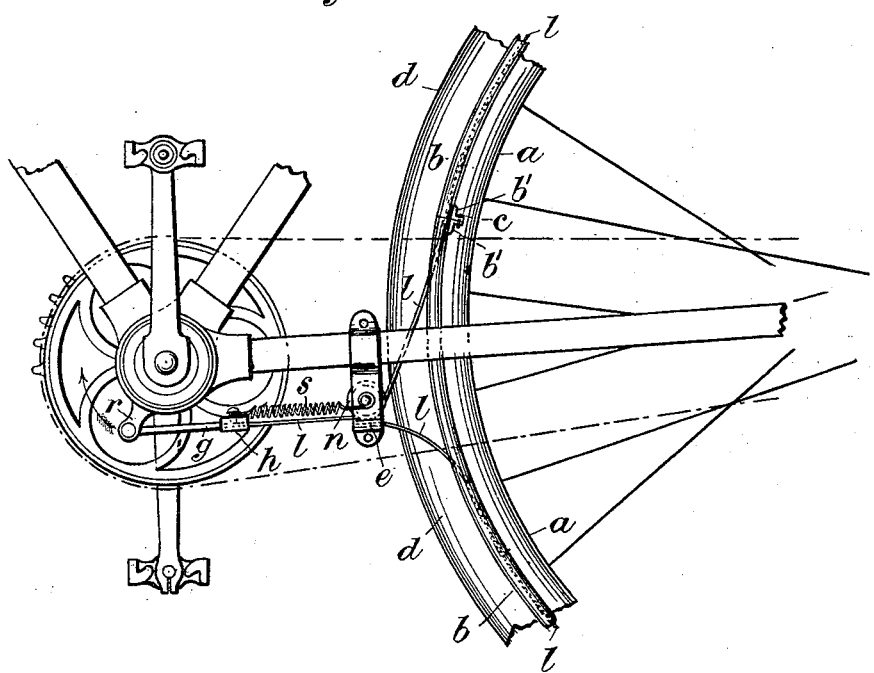

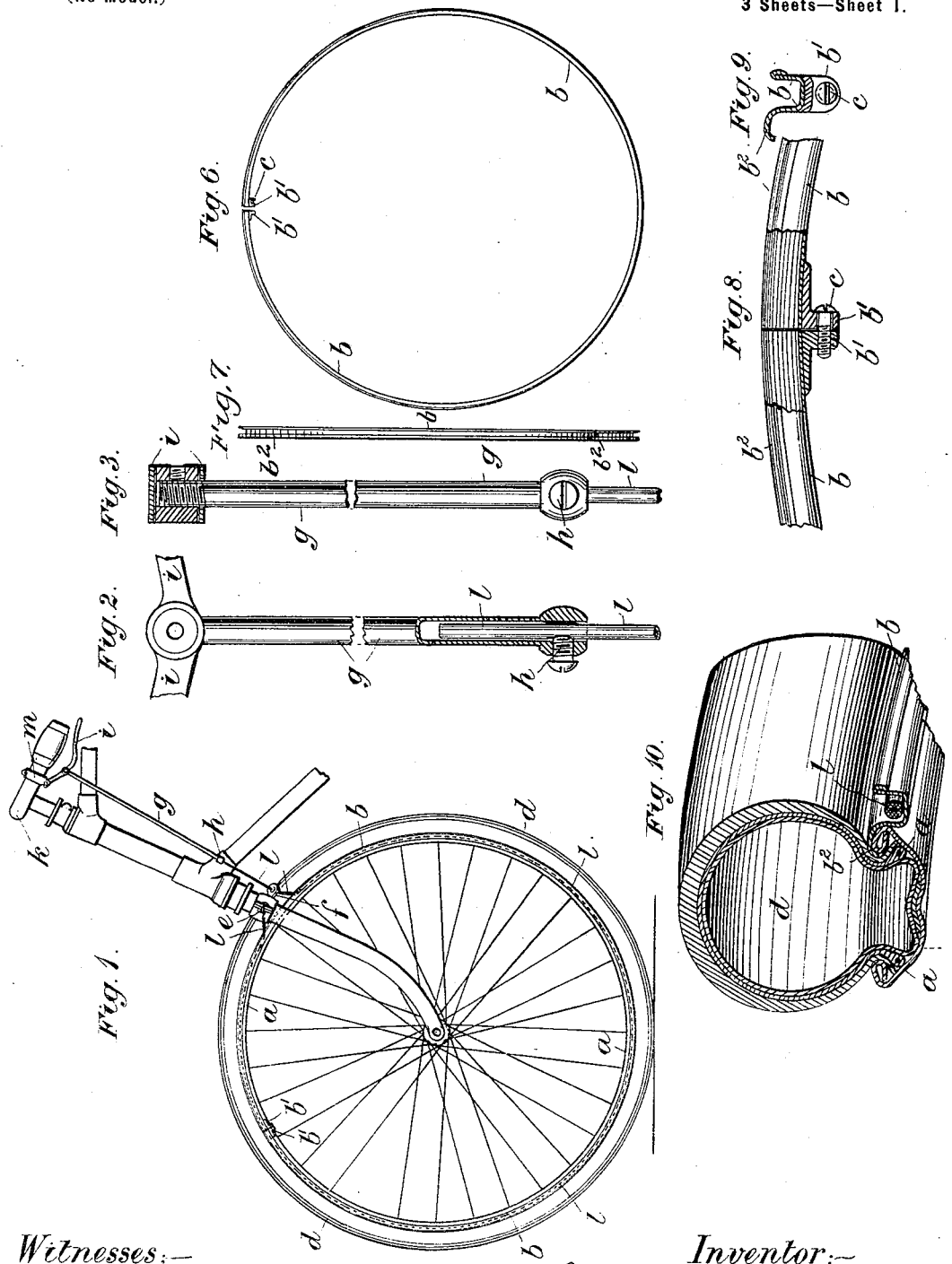

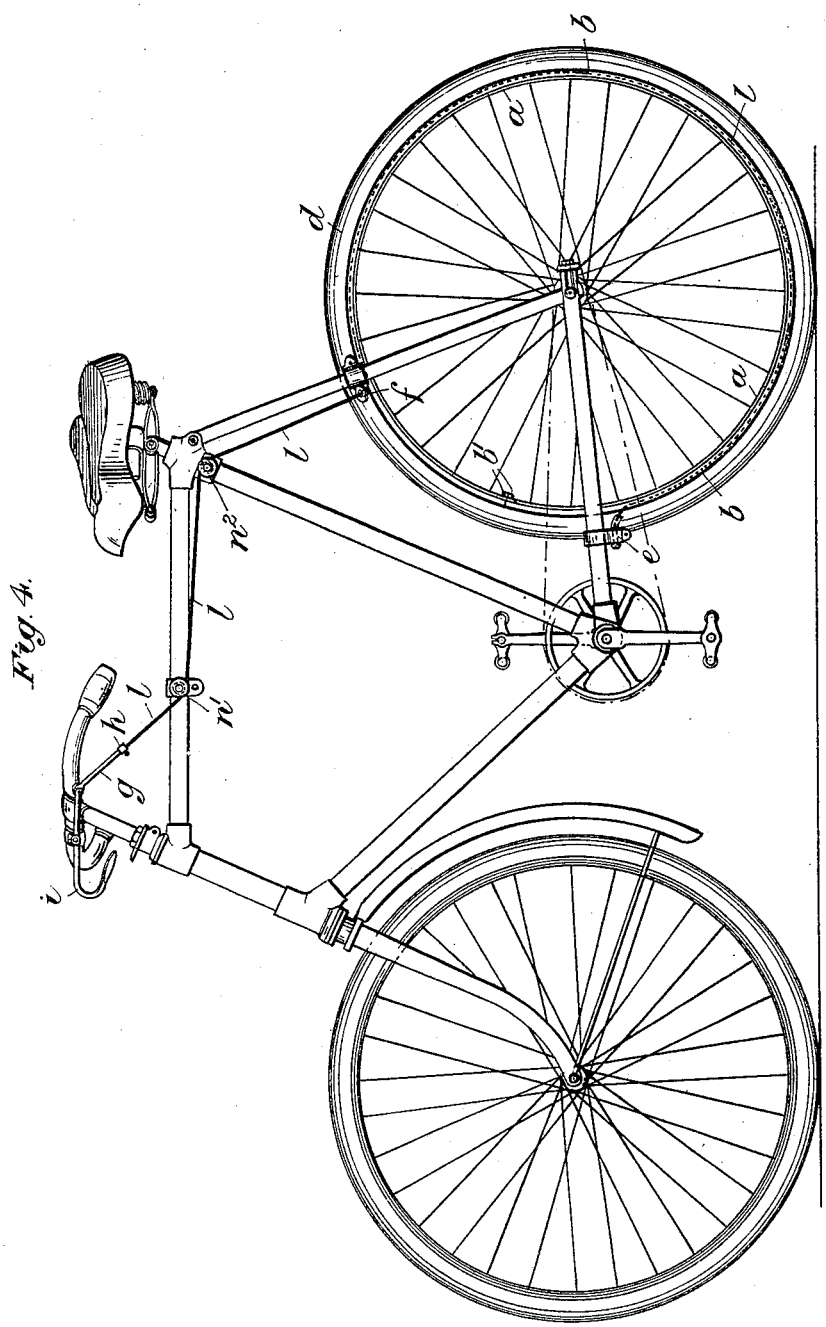

No. 658,654. Patented Sept. 25, 1900.
H. A. LAMPLUGH.
VELOCIPEDE BRAKE.
(Application filed Dec. 18, 1899.)

(No Model.) 3 Sheets—Sheet 3.

Witnesses:—
George Shaw
Arthur J. Powell

Inventor:—
Henry Arthur Lamplugh

UNITED STATES PATENT OFFICE.

HENRY ARTHUR LAMPLUGH, OF BIRMINGHAM, ENGLAND.

VELOCIPEDE-BRAKE.

SPECIFICATION forming part of Letters Patent No. 658,654, dated September 25, 1900.

Application filed December 18, 1899. Serial No. 740,767. (No model.)

*To all whom it may concern:*

Be it known that I, HENRY ARTHUR LAMPLUGH, a subject of the Queen of Great Britain, residing at Mitre Works, Bishop street, Birmingham, England, have invented certain new and useful Improvements in Brakes for Velocipedes and other Vehicles, of which the following is a specification.

My invention relates to brakes of the kind in which a band or cord or bands or cords are made to occupy a trough on one or both edges of the wheel-rim, the said cord or cords being tightened or slackened by the brake-lever of the velocipede or the like or in the way hereinafter described; and my invention has for its object to simplify the construction and arrangement of the parts of such brakes, so as to facilitate their application to velocipedes and wheel-vehicles generally.

In order that my invention may be the better understood, I remark that the rims of wheels to which brakes of the kind referred to are applied have made in one piece therewith the additional or supplementary rim or trough or rims or troughs for the brake cord or cords and that brakes of the kind referred to are applicable only to velocipedes, one or both of the wheels of which have the additional or supplementary rim or trough described.

My invention has for its principal object to render brakes of the kind described applicable generally, and for this purpose I make the additional or supplemtary rim or trough separate from the wheel-rim and preferably open jointed, the said open-jointed brake-rim having on one side or edge a flange of a size and shape proper to overhang and engage one edge of the wheel-rim. The accidental detachment of the brake rim or trough when engaged with the wheel-rim is prevented by a screw-pin passing through lugs on the two ends of the brake-rim, drawing the flange of the said brake-rim tightly on the edge of the wheel-rim, or by the pressure of the inflated tire on the said flange of the brake-rim or by the action of the screw described, combined with that of the pressure of the inflated tire.

Figure 1 of the accompanying drawings represents in side elevation the front part of a safety-bicycle having my improved brake applied to the front or steering wheel, the said brake being operated by a hand-lever situated under one of the handles of the bicycle. Figs. 2 and 3 represent portions of Fig. 1 drawn to a larger scale. Fig. 4 represents in side elevation a safety-bicycle to the back or driven wheel of which my improved brake is applied, the said brake being operated by a hand-lever. Fig. 5 represents a portion of the back wheel of a bicycle and parts adjacent thereto, in which the brake is put in operation by back-pedaling. Fig. 6 represents in side elevation, and Fig. 7 in edge view, the supplementary or brake rim detached; and Figs. 8 and 9 are sectional views at right angles to one another of a portion of the said brake-rim. Fig. 10 is a sectional view of the combined wheel and brake rims and inflated pneumatic tire. Figs. 8, 9, and 10 are drawn to a larger scale than Figs. 1, 4, 5, 6, and 7.

The same letters of reference indicate the same parts in the several figures of the drawings.

Referring to Figs. 1, 2, 3, 6, 7, 8, 9, and 10, $a$ is the wheel-rim proper, and $b$ the open-jointed supplementary or brake rim, the flanged edge $b^2$ of which overhangs one edge of the wheel-rim, as will be best understood by reference to Fig. 10. The brake-rim $b$ is tightened on the wheel-rim proper, $a$, by drawing together the lugs $b'$ $b'$ on the ends of the brake-rim $b$ by the screw-pin $c$. The inflated tire $d$ assists in keeping the brake-rim $b$ in place.

In applying the brake-cord $l$, which is preferably a vulcanized or waterproofed cord, to the rim $b$ one end of the said cord is fixed to one of the branches of the steering-fork at $e$, and after passing around the brake-rim passes through an eye $f$ and into the tubular brake-rod $g$, in which it is fixed by a screw or other clip $h$. The tubular brake-rod $g$ is jointed at or near the middle of a brake-lever $i$, connected to the handle-bar $k$ by means of a clip $m$. By operating the hand-lever $i$ the brake-rod $g$ is lifted and the cord $l$ tightened in the brake-rim $b$ to any extent desired by the rider, and on the release of the lever the parts resume their normal or non-acting positions.

In applying my improved brake to the back wheel, as represented in Fig. 4, I employ a lever $i$, operating in a different manner to that shown in Fig. 1; but the tubular brake-rod $g$ in said Fig. 4 differs in no essential respect from that first described. The cord $l$ passes over guiding-pulleys $n'$ $n^2$ and through an eye $f$ and terminates at $e$ on one of the branches of the chain stay fork of the bicycle.

In applying my improved brake to the back wheel of a free-wheel bicycle I arrange the parts as represented in Fig. 5—that is to say, the tubular brake-rod $g$ is attached to an arm $r$, which has a slight angular motion in the direction of the arrow on the back-pedaling of the bicycle, the return of the arm being effected by a spring $g$ on relieving the back pressure on the pedals. A guiding-roller $n$ is employed for the cord $l$, which after passing around the rim $b$ is fixed at $e$.

Having now described my invention, what I claim as new, and desire to secure by Letters Patent, is—

The combination with the wheel-rim of a velocipede or other vehicle, of an expansible brake-rim provided with an arched flange which overhangs one edge of the wheel-rim and by which said brake-rim is detachably connected to the wheel-rim, and means for drawing the two ends of the brake-rim together to cause the flange thereof to grip the wheel-rim, substantially as described.

In testimony whereof I have hereunto set my hand in presence of two subscribing witnesses.

HENRY ARTHUR LAMPLUGH.

Witnesses:
 GEORGE SHAW,
 ARTHUR J. POWELL.